(12) United States Patent
Wrede et al.

(10) Patent No.: US 11,415,684 B2
(45) Date of Patent: Aug. 16, 2022

(54) MONITORING DEVICE OF A LIDAR SYSTEM

(71) Applicant: Robert Bosch GmbH, Stuttgart (DE)

(72) Inventors: Martin Wrede, Reutlingen (DE); Rene Adams, Nuertingen (DE); Reiner Schnitzer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 636 days.

(21) Appl. No.: 16/472,562

(22) PCT Filed: Jan. 8, 2018

(86) PCT No.: PCT/EP2018/050340
§ 371 (c)(1),
(2) Date: Jun. 21, 2019

(87) PCT Pub. No.: WO2018/134069
PCT Pub. Date: Jul. 26, 2018

(65) Prior Publication Data
US 2019/0317197 A1 Oct. 17, 2019

(30) Foreign Application Priority Data
Jan. 19, 2017 (DE) .......................... 102017200803.2

(51) Int. Cl.
*G01S 7/497* (2006.01)
*G01J 1/42* (2006.01)
*G01S 7/4861* (2020.01)

(52) U.S. Cl.
CPC ............. *G01S 7/497* (2013.01); *G01J 1/4257* (2013.01); *G01S 7/4861* (2013.01)

(58) Field of Classification Search
CPC ....... G01S 7/4861; G01S 7/497; G01J 1/4257
See application file for complete search history.

(56) References Cited

U.S. PATENT DOCUMENTS

| 5,592,033 A | 1/1997 | Gold |
| 5,923,427 A | 7/1999 | Dong |
| 2002/0131034 A1 | 9/2002 | Chien et al. |
| 2007/0121095 A1 | 5/2007 | Lewis |
| 2010/0157279 A1 | 6/2010 | Sun et al. |
| 2017/0285145 A1 * | 10/2017 | Kriebernegg ......... G01S 7/4861 |

FOREIGN PATENT DOCUMENTS

| DE | 102004007580 A1 | 9/2005 |
| DE | 102014211073 A1 | 12/2015 |
| EP | 1291673 A2 | 3/2003 |

(Continued)

OTHER PUBLICATIONS

International Search Report for PCT/EP2018/050340, dated Apr. 10, 2018.

*Primary Examiner* — Kevin K Pyo
(74) *Attorney, Agent, or Firm* — Norton Rose Fulbright US LLP; Gerard Messina

(57) ABSTRACT

The invention relates to a monitoring device (1) of a LIDAR system (2), including a detector (5) for detecting laser light and for generating a reference signal (100) from the laser light, and a control loop (6) for minimizing a difference between an amplitude of the reference signal (100) and an amplitude of an actuating signal (200) by varying the actuating signal (200).

14 Claims, 2 Drawing Sheets

(56) References Cited

FOREIGN PATENT DOCUMENTS

| | | |
|---|---:|---:|
| EP | 1414154 A1 | 4/2004 |
| EP | 2597483 A1 | 5/2013 |
| EP | 2990826 A1 | 3/2016 |
| JP | S57166582 A | 10/1982 |
| JP | 2014102072 A | 6/2014 |
| WO | 2005064273 A1 | 7/2005 |
| WO | 2018134069 A1 | 7/2018 |

* cited by examiner

MONITORING DEVICE OF A LIDAR SYSTEM

BACKGROUND INFORMATION

The present invention relates to a monitoring device of a LIDAR system. Moreover, the present invention relates to a LIDAR system including a monitoring device. The LIDAR system is designed, in particular, for emitting laser pulses having very short pulse durations.

Monitoring LIDAR systems is known from the related art. For this purpose, an emitted light output of the LIDAR system is ascertained to establish whether the emitted light output has exceeded a threshold value. If this is the case, the light output has to be reduced since otherwise a hazard for people, for example due to eye damage, may occur.

Long-wave pulses are thus used in conventional LIDAR systems to be able to optimally determine the light output. However, with respect to a detector which detects laser beams reflected by objects in the surroundings, it may be advantageous when preferably short pulses are present. Short pulses are, in particular, understood to mean pulses having a duration of maximally 10 ns.

If it is attempted to convert a signal having short pulses from analog to digital, which is necessary for determining the light output, considerable difficulties and inaccuracies occur. As a result, it is no longer possible to ensure its reliable function monitoring. For this reason, the use of short laser pulses is dispensed with in LIDAR systems which are intended, in particular, for use in vehicles.

SUMMARY OF THE INVENTION

The monitoring device according to the present invention allows a reliable monitoring of a LIDAR system. In particular, the determination of a light output is possible, even when short pulses are present. At the same time, the monitoring device has a simple and cost-effective design. Finally, it is possible, in particular, to test the monitoring device at any time.

The monitoring device according to the present invention of a LIDAR system includes a detector and a control loop. The detector is designed to detect laser light and to generate a reference signal from the laser light. The reference signal is, in particular, an electrical signal and represents a light output of the laser light detected by the detector. The control loop is designed to minimize a difference between an amplitude of the reference signal and an amplitude of an actuating signal. For this purpose, the actuating signal is preferably varied. It is thus not attempted in the monitoring device to quantize an individual pulse, but a regulation is preferably carried out over multiple pulses. The regulation minimizes the difference between the amplitude of the reference signal and the amplitude of the actuating signal, so that the amplitude of the actuating signal ultimately corresponds to the amplitude of the reference signal. As soon as the control loop has settled, a variable, which may be regarded as the measured value of the amplitude of a pulse of the laser light, is thus always available in the form of the actuating signal. In this way, amplitudes having very short pulses, in particular pulses having a width of less than 10 ns, are ascertainable.

The subclaims show preferred refinements of the present invention.

The control loop preferably includes a comparator for ascertaining a difference between the reference signal and the actuating signal. In particular, the comparator is designed to carry out a subtraction of the amplitude of the reference signal and of the amplitude of the actuating signal. Furthermore, the control loop preferably includes a control unit for varying the actuating signal as a function of the difference which was ascertained by the comparator. The actuating signal thus represents the controlled variable within the control loop. The control unit is used, in particular, to minimize this difference, the control unit using a known method for varying the actuating signal for this purpose. Such methods are, in particular, the Newton method and/or the Runge-Kutta method. These methods have the advantage that a fast convergence is achievable. The control loop thus only requires a short time for completing the settling process.

Particularly advantageously, the control unit is configured to set the difference to the value zero by varying the actuating signal. In this way, the amplitude of the actuating signal converges to the value which the amplitude of the reference signal also has. Based on the amplitude of the actuating signal, it may thus be identified how large the amplitude of the reference signal is. The actuating signal thus serves as a measured variable for the amplitude of the reference signal. For this purpose, the actuating signal is preferably constant, so that the amplitude of the actuating signal is represented by a constant value.

The control unit is preferably designed to output a digital signal. The digital signal is convertible into the actuating signal by a digital-to-analog converter. In this way, a digital representation of the amplitude of the reference signal is already present with the digital signal, in particular as soon as the control loop has settled. As a result, a complex or impossible measurement of the amplitude of the reference signal and an associated analog-to-digital conversion is not necessary.

Preferably, moreover an additional comparator is provided. The additional comparator is used to ascertain a difference between the reference signal and the actuating signal whose amplitude is cut in half. Again, it is preferred that the actuating signal is a constant signal, so that the difference only causes a shift of the reference signal in the amplitude direction. This takes place, in particular, by half the amplitude of the actuating signal. In particular, it is provided that the pulse width is determined as the time which elapses after a signal has risen to half the amplitude and before the signal has dropped to half the amplitude. A pulse width signal which indicates a pulse width of the reference signal is thus determined by the additional comparator. In particular, the pulse width signal is only present for the duration of the pulse width according to the above definition.

Particularly advantageously, a pulse width estimation unit is present. The pulse width estimation unit is used to count a number of a predefined unit of time during which a pulse of the pulse width signal is present at the pulse width estimation unit. As a result, the pulse width is determined as a multiple of the predefined unit of time. Moreover, the pulse width estimation unit is designed to output a BCD counter code which indicates the number of the predefined units of time. As a result, the pulse width is calculatable based on the BCD counter code by multiplying the length of the predefined unit of time by the number of predefined units of time. The pulse width estimation unit particularly advantageously includes a plurality of test units connected in series. It is provided that each test unit is designed to output a binary signal as to whether the pulse continues to be present at the pulse width estimation unit after waiting the predefined unit of time. The BCD counter code is advantageously composed of the binary signals of the test units. Due to the series connection, the predefined unit of time is cumulative. This means that a first test unit in the series connection checks whether the pulse width signal is present at the pulse width estimation unit after the predefined unit of time. If this is the case, a binary 0 is output, otherwise a binary 1 is output, which each form a first value of the BCD counter code. Afterwards, the next test unit in the series connection checks, after again waiting the predefined unit of time, whether the pulse width signal continues to be present. This continues until all test units have carried out the check. However, since every test unit only becomes active when all upstream test units of the series connection have completed the check, the number of binary is and/or binary 0s within the BCD counter code is a measure of the pulse width in that its number and/or distribution represents the multiplier for the duration of the predefined unit of time.

Furthermore, each counting unit particularly advantageously includes a delay element and a D flip flop. The delay element is used for the delayed application of a binary signal, which indicates the presence of a rising edge of the pulse width signal, to a data input of the D flip flop. The delay encompasses the length of the predefined unit of time. At the same time, a binary signal, which indicates the presence of a falling edge of the pulse width signal, is applied to a clock input of the D flip flop without delay. The outputs of all present D flip flops form the BCD counter code. Since the pulse width signal is only present for the duration of the pulse of the reference signal, a time between a rising edge and a falling edge is thus preferably the pulse width. This is determined by the D flip flop. Should the delayed binary signal on the rising edge be present at the D flip flop simultaneously with the non-delayed binary signal on the falling edge, an output of the D flip flop is switched to a binary 1. Due to the plurality of counting units, a plurality of delay elements is connected in series, each delay element applying the binary signal, which indicates the presence of the rising edge of the pulse width signal, with delay to the respective D flip flop of the counting unit. The binary signal, which indicates the presence of the falling edge of the pulse width signal, is always applied without delay to the D flip flop of the counting unit. The binary results of the individual D flip flops thus ascertained are output in the BCD counter code.

The detector is preferably used to generate a characteristic current signal from the laser light. It is provided that the current signal is convertible into the reference signal by a transimpedance converter. The reference signal is thus formed by a variable voltage. This simplifies the further processing of the reference signal by the comparator and the additional comparator.

The detector advantageously encompasses a PIN diode and/or an avalanche photodiode. In this way, the monitoring unit is implementable easily and with low complexity, at the same time reliable monitoring of a LIDAR system being made possible.

The present invention finally relates to a LIDAR system. The LIDAR system encompasses a laser light source, a decoupling unit and a monitoring device as described above. It is provided that short light pulses are emitted with the aid of the laser light source. Short light pulses are, in particular, to be understood to mean those pulses having a duration of maximally 10 ns, in particular of maximally 5 ns. Furthermore, it is provided that the laser light from the laser light source is at least partially conductible by the decoupling unit to the monitoring device.

BRIEF DESCRIPTION OF THE DRAWINGS

Exemplary embodiments of the present invention are described in detail hereafter with reference to the accompanying drawings.

DETAILED DESCRIPTION OF THE INVENTION

Figure 1:
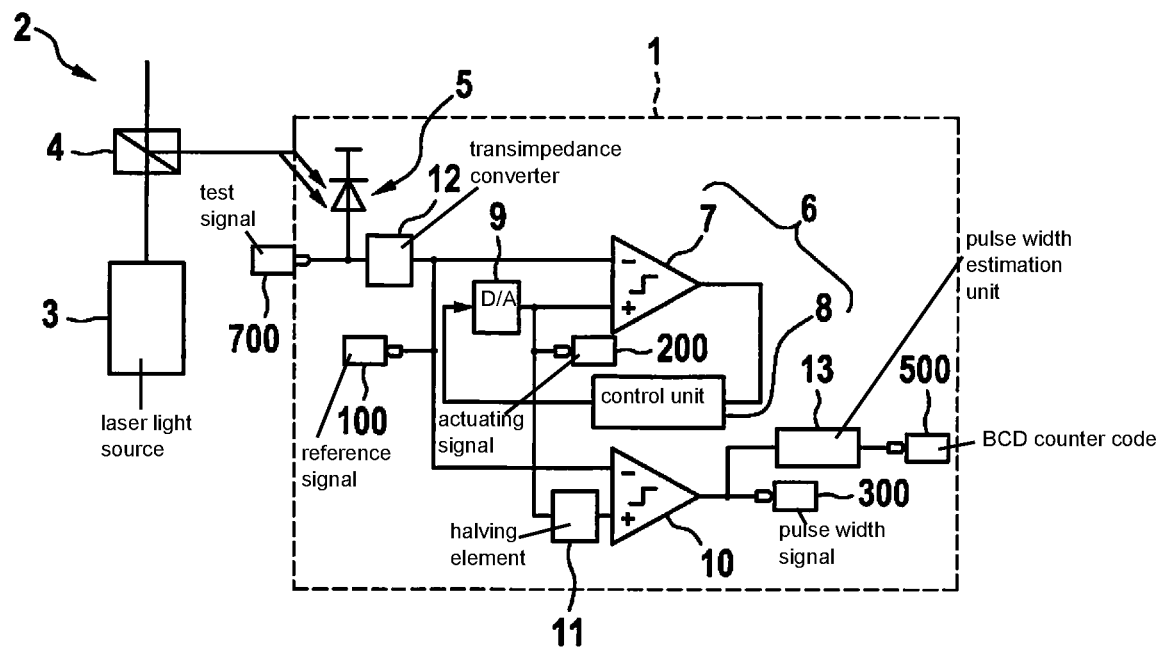
FIG. 1 shows a schematic illustration of a LIDAR system including a monitoring device according to one exemplary embodiment of the present invention.

FIG. 1 schematically shows a LIDAR system 2 including a monitoring device 1 according to one exemplary embodiment of the present invention. LIDAR system 2 includes a laser light source 3 which is designed to emit laser light. In particular, short light pulses of maximally 10 ns, in particular 5 ns, are emittable by laser light source 3. Such short light pulses are advantageous since they allow the use of cost-effective avalanche photodiodes as detectors (not shown).

Monitoring device 1 is used for monitoring the function of LIDAR system 2. For this purpose, a portion of the laser light which was emitted by laser light source 3 is conducted to monitoring device 1 via a decoupling unit 4. In particular, decoupling unit 4 is a lens of a lens system (not shown) of LIDAR system 2.

Monitoring device 1 includes a detector 5, which is designed to receive the laser light and to generate a reference signal 100 from the received laser light. In particular, detector 5 generates an electrical current signal, which reflects a received light output. In one advantageous specific embodiment, a transimpedance converter 12 is provided for converting the current signal into a voltage signal. In this way, the reference signal 100 is a voltage signal in which a voltage changes relative to the light output received from detector 5. Since laser light source 3 is designed to emit short light pulses, reference signal 100 also includes short voltage pulses which last maximally 10 ns, in particular maximally 5 ns.

Figure 3:
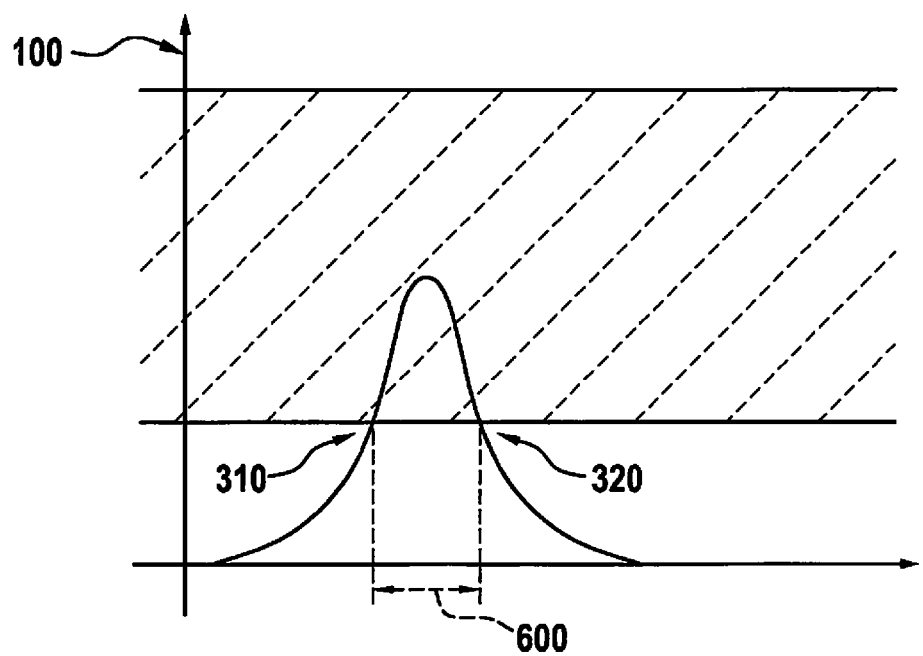
FIG. 3 shows a schematic illustration of a reference signal of the monitoring device according to one exemplary embodiment of the present invention.

The duration of a pulse is also referred to as pulse width 600 (cf. FIG. 3). This is the time period over which the pulse has at least half the amplitude. Thus, the time period begins with reference signal 100 rising over half the amplitude and ending with the reference signal dropping below half the amplitude.

To determine an energy of a pulse, it is necessary for the amplitude and pulse width 600 to be known. As a result, initially the amplitude is to be determined, so as to then ascertain pulse width 600. As soon as these parameters are known, the energy of the pulse may be inferred. This, in turn, makes it possible to ascertain the light output of the laser light. Overall, it is thus detectable whether the light output is below a predefined limiting value. Should this not be the case, the LIDAR system poses a potential hazard for people, in particular for human eyes, which is why a correction of the light output is necessary.

A control loop 6 is present for ascertaining the amplitude of reference signal 100. Control loop 6 encompasses a comparator 7 and a control unit 8. Comparator 7 is used to calculate a difference between reference signal 100 and an actuating signal 200. In particular, comparator 7 calculates a difference between the amplitude of reference signal 100 and the amplitude of actuating signal 200. This difference is to be minimized, in particular to the value 0.

To minimize the difference, control unit 8 varies actuating signal 200. Actuating signal 200 is thus adapted to reference signal 100 by control unit 8. In particular, an amplitude of reference signal 100 is represented by actuating signal 200. The amplitude of actuating signal 200 is thus a measure of the amplitude of the reference signal.

Control unit 8 outputs a digital signal in response to the difference calculated by comparator 7. This digital signal is converted into an analog signal, actuating signal 200, by a digital-to-analog converter 9. In this way, comparator 7 is able to subtract actuating signal 200 from the reference signal.

Control loop 6 requires a settling time for settling. This shall be understood to mean that actuating signal 200 converges to a final value. This settling time encompasses, in particular, the duration of less than ten pulses, in particular of maximally five pulses, of the reference signal. After settling, a variable which represents at least one amplitude of reference signal 100 is available with actuating signal 200.

To ascertain the pulse duration or pulse width 600, the amplitude of actuating signal 200 is cut in half. A halving element 11 is present for this purpose. Actuating signal 200, having its amplitude thus cut in half, is applied together with reference signal 100 to an additional comparator 10. It determines the difference between actuating signal 200, having its amplitude cut in half, and reference signal 100. This results in a pulse width signal 300, which is only present for the duration of pulse width 600 according to the above definition. This means that a rising edge of pulse width signal 300 indicates the start of the pulse, whereas a falling edge indicates an end of the pulse. To ascertain the time period between the rising edge and the falling edge, a pulse width estimation unit 13 is present.

Figure 2:
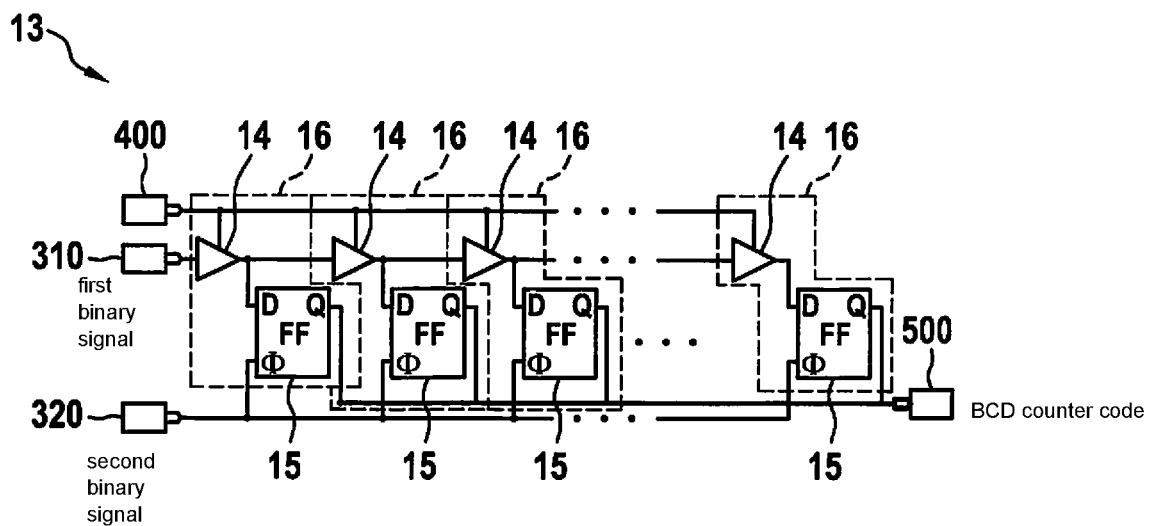
FIG. 2 shows a schematic illustration of a pulse width estimation unit of the monitoring device according to the exemplary embodiment of the present invention.

Pulse width estimation unit 13 is shown in FIG. 2. Based on pulse width estimation unit 13, it is ascertainable what multiple of a predefined unit of time corresponds to pulse width 600. A plurality of test units 16 is present for this purpose.

Each test unit 16 includes a delay element 14 and a D flip flop 15. It is provided that all test units 16 are connected in series.

With the aid of delay element 14 of a test unit 16, a first binary signal 310 may be applied with delay to a data input of D flip flop 15 of test unit 16. The delay is predefined by the predefined unit of time. At the same time, a second binary signal 320 is applied without delay to a clock input of D flip flop 15. In this way, D flip flop 15 is then switchable to the initial value of a binary 1 when both first binary signal 310 and second binary signal 320 indicate a binary 1.

First binary signal 310 represents whether a rising edge of pulse width signal 300 is present. If this is the case, first binary signal 310 is a binary 1. Second binary signal 320 represents whether a falling edge of pulse width signal 300 is present. The output of D flip flop 15 thus indicates whether there is at least the predefined unit of time between the occurrence of the rising edge and the falling edge.

As is shown in FIG. 2, all test units 16 are connected in series. This means, in particular, that all delay elements 14 are connected in series. In this way, a delay of first binary signal 310 is cumulated, whereas second binary signal 320 is always applied without delay to all D flip flops 15. In this way, pulse width 600 may be determined easily and with low complexity.

Pulse width 600 is represented by a BCD counter code 500, which includes the outputs of all D flip flops 15. It is described based on BCD counter code 500 how many predefined units of time pulse width 600 corresponds to. In this way, pulse width 600 may be ascertained with low complexity.

As a result, pulse width 600 and the amplitude are thus ascertained easily and with low complexity, the described exemplary embodiment being applicable, in particular, to short laser light pulses. A light output of the laser light may be calculated from pulse width 600 and the amplitude, whereby the light output is ascertainable easily and with low complexity. This results in optimal monitoring of the function of LIDAR system 2. In particular, it is avoidable that excessively high light outputs occur, which may damage a human organism, in particular human eyes.

FIG. 3 schematically shows a curve of a pulse of reference signal 100. In the diagram, the y-axis is a voltage and the x-axis is a time. FIG. 3 moreover shows pulse width 600, the position of rising edge 310 and the position of falling edge 320 being shown for this purpose.

Figure 4:
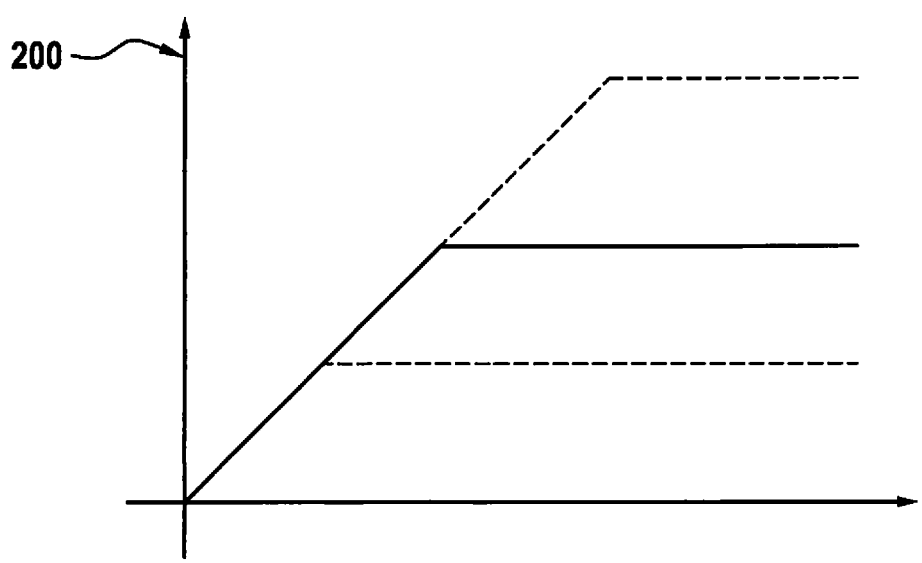
FIG. 4 shows a schematic illustration of an actuating signal of the monitoring device according to the exemplary embodiment of the present invention.

FIG. 4 schematically shows a curve of actuating signal 200. Actuating signal 200 is, in particular, a constant value set by control unit 8. Thus, initially a settling phase exists, in which actuating signal 200 increases until the actuating signal has reached the reference signal. In this case, the constant value of actuating signal 200 corresponds to the amplitude of reference signal 100. FIG. 4 furthermore schematically shows that no noteworthy changes are made to actuating signal 200 after settling.

The dotted areas shown in FIG. 3 and FIG. 4 indicate the maximum control range of control loop 6. This range is limited by a limited variability of actuating signal 200. It is thus provided that the control range is adapted to the pulses of reference signal 100 to be expected.

Instead of the incident light upon detector 5, it is also possible to feed a test signal 700 into monitoring device 1. Test signal 700 is used for testing monitoring device 1 and represents a virtual result of detector 5. Test signal 700 is thus handled in the same manner as reference signal 100. This allows continuous control of monitoring device 1. A failure of monitoring device 1 or a malfunction of monitoring device 1 is thus prevented.

What is claimed is:

1. A monitoring device of a LIDAR system, comprising:
   a detector to detect laser light and to generate an electrical signal, which represents a received light output, from the laser light; and
   a control loop to minimize a difference between an amplitude of a reference signal and an amplitude of an actuating signal by varying the actuating signal;
   wherein the control loop includes a comparator to ascertain a difference between the reference signal and the actuating signal, and a control unit to vary the actuating signal as a function of the difference ascertained by the comparator, and further includes an additional comparator to ascertain a difference between the amplitude of the reference signal and half an amplitude of an actuating signal to determine a pulse width signal which indicates a pulse width of the reference signal.

2. The monitoring device as recited in claim 1, wherein the control loop is configured to set the difference to the value zero by varying the actuating signal.

3. The monitoring device as recited in claim 1, wherein the control unit is configured to output a digital signal, the digital signal being convertible into the actuating signal by a digital-to-analog converter.

4. The monitoring device as recited in claim 1, further comprising:
a pulse width estimation unit to count a number of a predefined unit of time during which a pulse of the pulse width signal is present at the pulse width estimation unit and to output a BCD counter code which indicates the number of the predefined units of time, wherein the pulse width estimation unit includes a plurality of test units connected in series, each test unit of the plurality of test units being configured to output a binary signal as to whether the pulse continues to be present at the pulse width estimation unit after waiting the predefined unit of time, and wherein the BCD counter code includes the binary signals of the test units.

5. The monitoring device as recited in claim 4, wherein each counting unit includes a delay element configured to apply, delayed by the predefined unit of time, a respective binary signal, which indicates a presence of a rising edge of the pulse width signal, to a data input of a D flip flop, a binary signal, which indicates the presence of a falling edge of the pulse width signal, being applied to a clock input of the D flip flop without delay, and the outputs of all present D flip flops forming the BCD counter code.

6. The monitoring device as recited in claim 1, wherein the detector is configured to generate a characteristic current signal from the laser light, the current signal being convertible into the reference signal by a transimpedance converter.

7. The monitoring device as recited in claim 1, wherein the detector includes a PIN diode and/or an avalanche photodiode.

8. A LIDAR system, comprising:
a laser light source;
a decoupling unit; and
a monitoring device including a detector to detect laser light and to generate an electrical signal, which represents a received light output, from the laser light, and a control loop to minimize a difference between an amplitude of a reference signal and an amplitude of an actuating signal by varying the actuating signal;
wherein the control loop includes a comparator to ascertain a difference between the reference signal and the actuating signal, and a control unit to vary the actuating signal as a function of the difference ascertained by the comparator, and further includes an additional comparator to ascertain a difference between the amplitude of the reference signal and half an amplitude of an actuating signal to determine a pulse width signal which indicates a pulse width of the reference signal, and
wherein the laser light is at least partially conductible by the decoupling unit to the monitoring device.

9. The LIDAR system as recited in claim 8, wherein the control loop is configured to set the difference to the value zero by varying the actuating signal.

10. The LIDAR system as recited in claim 8, wherein the control unit is configured to output a digital signal, the digital signal being convertible into the actuating signal by a digital-to-analog converter.

11. The LIDAR system as recited in claim 8, wherein the monitoring device further comprises:
a pulse width estimation unit to count a number of a predefined unit of time during which a pulse of the pulse width signal is present at the pulse width estimation unit and to output a BCD counter code which indicates the number of the predefined units of time, wherein the pulse width estimation unit includes a plurality of test units connected in series, each test unit of the plurality of test units being configured to output a binary signal as to whether the pulse continues to be present at the pulse width estimation unit after waiting the predefined unit of time, and wherein the BCD counter code includes the binary signals of the test units.

12. The LIDAR system as recited in claim 11, wherein each counting unit includes a delay element configured to apply, delayed by the predefined unit of time, a respective binary signal, which indicates a presence of a rising edge of the pulse width signal, to a data input of a D flip flop, a binary signal, which indicates the presence of a falling edge of the pulse width signal, being applied to a clock input of the D flip flop without delay, and the outputs of all present D flip flops forming the BCD counter code.

13. The LIDAR system as recited in claim 11, wherein the detector is configured to generate a characteristic current signal from the laser light, the current signal being convertible into the reference signal by a transimpedance converter.

14. The LIDAR system as recited in claim 11, wherein the detector includes a PIN diode and/or an avalanche photodiode.

* * * * *